(12) United States Patent
Knebel

(10) Patent No.: US 8,176,255 B2
(45) Date of Patent: May 8, 2012

(54) ALLOCATING SPACE IN DEDICATED CACHE WAYS

(75) Inventor: Patrick Knebel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 11/875,168

(22) Filed: Oct. 19, 2007

(65) Prior Publication Data

US 2009/0106494 A1    Apr. 23, 2009

(51) Int. Cl.
*G06F 12/12* (2006.01)

(52) U.S. Cl. .......... 711/128; 711/130; 711/133

(58) Field of Classification Search .......... None
See application file for complete search history.

(56) References Cited

U.S. PATENT DOCUMENTS

| | | | | |
|---|---|---|---|---|
| 5,530,832 A * | 6/1996 | So et al. | ......... | 711/122 |
| 6,574,710 B1 * | 6/2003 | Gaither et al. | ......... | 711/122 |
| 6,665,775 B1 * | 12/2003 | Maiyuran et al. | ......... | 711/129 |
| 6,725,336 B2 * | 4/2004 | Cherabuddi | ......... | 711/129 |
| 6,877,089 B2 | 4/2005 | Sinharoy | | |
| 6,901,450 B1 * | 5/2005 | Shimada | ......... | 709/232 |
| 7,076,609 B2 * | 7/2006 | Garg et al. | ......... | 711/120 |
| 2002/0069341 A1 | 6/2002 | Chauvel et al. | | |

* cited by examiner

*Primary Examiner* — Gary J Portka

(57) ABSTRACT

A system comprises a processor core and a cache coupled to the core and comprising at least one cache way dedicated to the core, where the cache way comprises multiple cache lines. The system also comprises a cache controller coupled to the cache. Upon receiving a data request from the core, the cache controller determines whether the cache has a predetermined amount of invalid cache lines. If the cache does not have the predetermined amount of invalid cache lines, the cache controller is adapted to allocate space in the cache for new data, where the space is allocable in the at least one cache way dedicated to the core.

16 Claims, 4 Drawing Sheets

ALLOCATING SPACE IN DEDICATED CACHE WAYS

BACKGROUND

Computer systems often use caches and other memory local to the caches to store data during operation. Because caches are of finite sizes, each cache is associated with one or more replacement algorithms. In the event that a cache is full and some cache data needs to be cleared to make space for new data, these replacement algorithms determine which cache data should be cleared and which cache data should remain in the cache. Replacement algorithms thus have a substantial impact on the efficiency of a cache system. Accordingly, improvements in cache replacement algorithms are desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, in the following discussion and in the claims, the term "couple" or "couples" is intended to mean either an indirect, direct, optical or wireless electrical connection. Thus, if a first device couples to a second device, that connection may be through a direct electrical connection or through an indirect electrical connection via other devices and connections. Further, in the claims and in the description, when a cache is described as performing an action, it is meant that either the cache is performing the action alone, in combination with a cache controller, or that the cache controller is performing the action alone. The term "processing logic" refers to any device or circuit logic, etc. that can access memory and/or a cache.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique by which a cache shared among multiple processor cores dynamically dedicates portions of the cache to each of the cores. In this way, cores engaging in inefficient behavior (e.g., thrashing) do not negatively impact the performance of the remaining cores. The technique also enables the cache to receive "hint transaction" signals from higher-level caches. These "hint transaction" signals enable the cache to identify which cache entries are duplicated in the higher-level caches and which entries are not duplicated in the higher-level caches. In this way, the cache is kept up-to-date and is less likely than otherwise to suffer from the consequences of outdated information.

Figure 1:
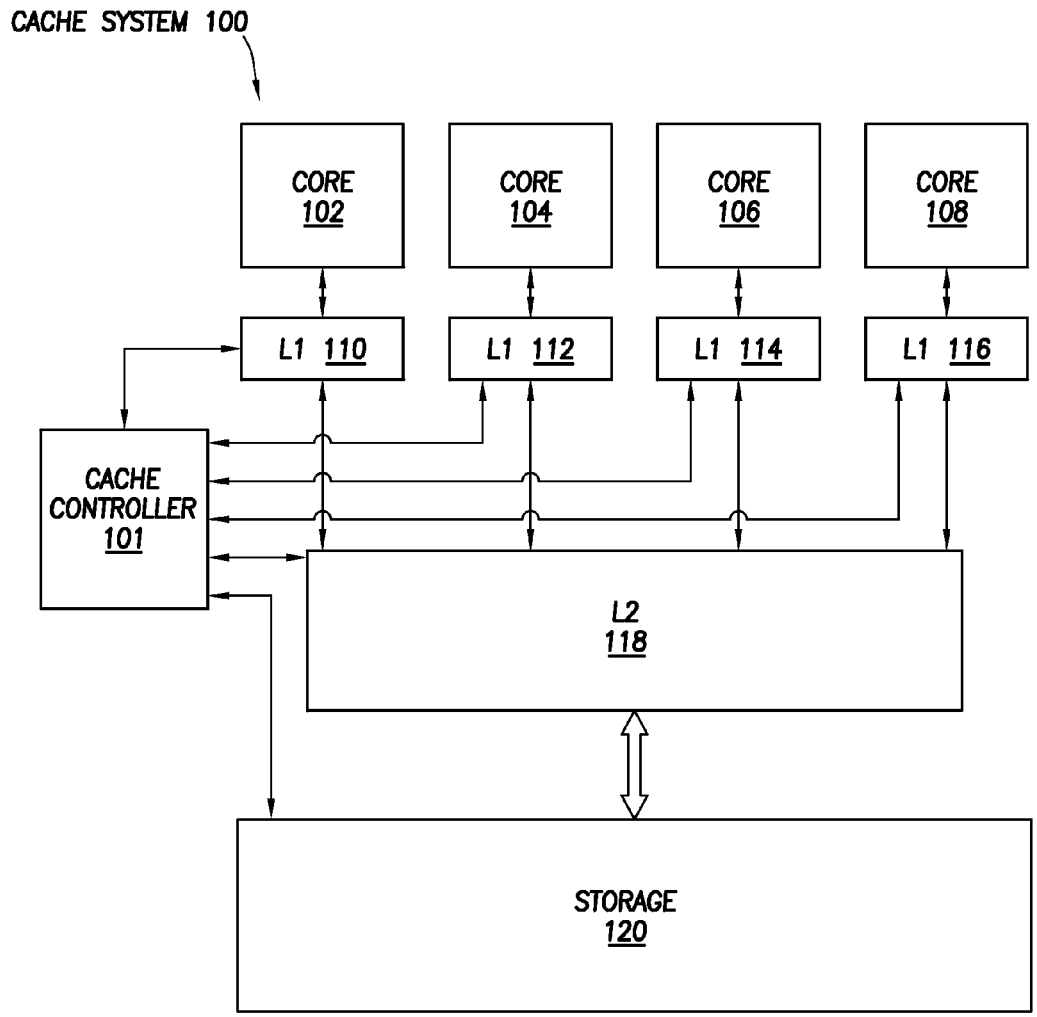
FIG. 1 shows a block diagram of an illustrative cache system, in accordance with various embodiments.

FIG. 1 shows a block diagram of an illustrative cache-based system 100. The cache system 100 may be implemented in any suitable electronic device, such as a computer (e.g., personal computer, server, gaming console, digital camera, digital music device, etc.). The system 100 comprises multiple processor cores 102, 104, 106 and 108 (also referred to as "processing logic"). Although four processor cores are explicitly shown, it is understood that any suitable number of cores may be used. The core 102 couples to a first-level cache ("L1 cache") 110. The L1 cache 110 is dedicated to the core 102, meaning that the core 102 is the only core that is permitted to use the L1 cache 110. The L1 cache 112 couples to and is dedicated to the core 104. The L1 cache 114 couples to and is dedicated to the core 106. The L1 cache 116 couples to and is dedicated to the core 108. Each of the L1 caches 110, 112, 114 and 116 couples to a shared, second-level cache ("L2 cache") 118. By "shared," it is meant that the L2 cache 118 is not dedicated to any particular processor core, but is instead usable by one or more of the processor cores. The L2 cache 106 couples to storage 120 (e.g., random access memory (RAM)). The caches 110, 112, 114, 116 and 118, as well as storage 120, may be controlled by cache controller 101.

The caches 110, 112, 114, 116 and 118 store information that the cores frequently access from the storage 120. In this way, the speeds of the cores are enhanced. In some embodiments, information stored in the caches 110, 112, 114 and 116 is accessed faster than is information stored in the cache 118. In some embodiments, information stored in the cache 118 is accessed faster than is information stored in the storage 120. For example, the cores may have processor speeds of 800 MHz, the L1 caches 110, 112, 114 and 116 may have access speeds of 800 MHz, the L2 cache 118 may have an access speed of 400 MHz, and the storage 120 may have an access speed of about 200 MHz.

When one of the cores requires data stored at a particular address in storage (e.g., as a result of executing a software application), the core first determines whether its dedicated L1 cache contains data associated with that address. If the address is found in that L1 cache (a cache "hit"), the core retrieves the data from that L1 cache at that particular address. If that L1 cache does not contain the address (a cache "miss"), the core then determines whether the next-fastest cache which it may access, the L2 cache 118, contains the address. If a cache hit occurs in the L2 cache 118, the core retrieves the data from the L2 cache 118 at that address. However, if a cache miss occurs in the L2 cache 118, the core obtains the data from the storage 120.

Figure 2:
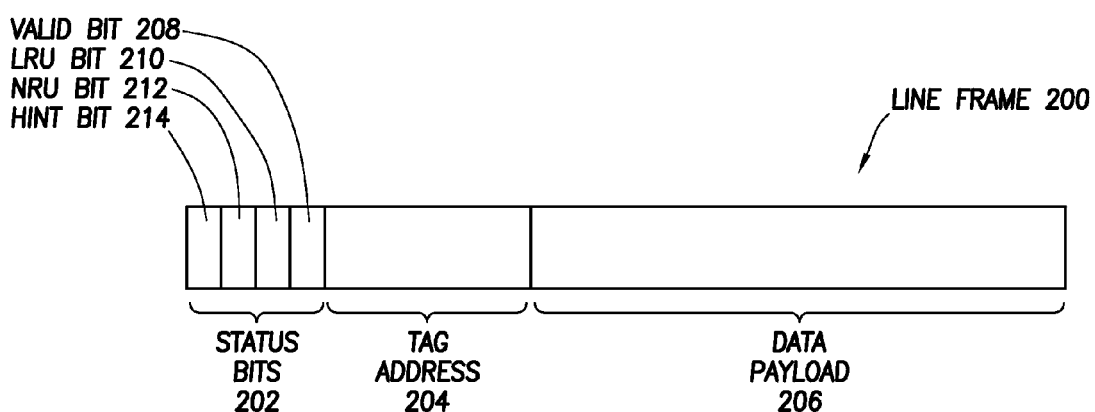
FIG. 2 shows an illustrative line frame stored in the cache system of FIG. 1, in accordance with various embodiments.

The caches comprise multiple "line frames" usable to store data and/or instructions (collectively referred to as "data"). As shown in FIG. 2, a line frame 200 is a data structure that stores a predetermined amount of data 206 in addition to status bits 202 and a tag address 204 associated with the data 206. In some embodiments, a line frame may store 32 bytes of data 206 known as a "line." In some embodiments, an amount of data 206 stored per line frame 200 in one cache differs from an amount of data stored per line frame in another cache.

The status bits 202 indicate status information pertaining to the line 206. For example, the status bits 202 may indicate whether the line 206 in a line frame 200 is valid (e.g., using valid bit 208), and if valid, whether the line 206 is "dirty" (dirty bit not explicitly shown). A line is "dirty" when the line has been updated with a data value that has not been used to update a corresponding line in a lower level memory. For instance, if a line in an L1 cache is updated but a corresponding line in the L2 cache is not updated with the same value, the L1 cache line is considered to be dirty.

The status bits 202 also may contain bits that are used by the corresponding cache's cache replacement algorithm. For example, the status bits 202 may contain one or more Least Recently Used (LRU) bits 210 and/or Not Recently Used (NRU) bits 212. An LRU bit having status "0" indicates that the corresponding line is "least recently used," or that the line has not been used within a predetermined time interval. An LRU bit having status "1" indicates that the corresponding line is "not least recently used," or that the line has been used within a predetermined time interval. In some embodiments, an LRU bit of "0" indicates recent usage and an LRU bit of "1" indicates lack of recent usage. Similarly, an NRU bit having status "0" indicates that the corresponding line has not been recently accessed (i.e., within a predetermined time interval). An NRU bit having status "1" indicates that the corresponding line has been recently accessed. In some embodiments, an NRU bit of "0" indicates a recent access and an NRU bit of "1" indicates lack of a recent access. The information contained in a line frame may be the same as, different than, similar to, less than or greater than that which is specifically disclosed herein. Other cache replacement algorithms are included within the scope of this disclosure.

Each line frame 200 in a cache is associated with a different address or range of addresses. An illustrative 32-bit address comprises a tag address (e.g., bits 31:14) such as tag address 204, a set address (e.g., bits 13:5) and an offset or NULL value (e.g., bits 4:0). Line (and associated line frames) having a common set address are mapped into a group known as a "set." Because lines within a set share a common set address, the lines within the set are distinguished from one another using the tag address of each line. Thus, if a core accesses cache data stored at a particular 32-bit address, the core uses the set address in bits 13:5 to locate a matching set in the cache, and then uses the tag address in bits 31:14 to locate a matching line within the set.

In accordance with various embodiments, each cache also has a specific number of "ways." A collection of corresponding line frames across all sets in a cache is called a "way" in the cache. The number of ways in a cache also corresponds to the number of line frames present in each set of the cache. For instance, a two-way cache has two ways, and each set in the cache has two line frames associated with that set, where each of the two line frames is associated with one of the two ways. As a result, data to be allocated to a particular set has two possible line frame destinations.

In some embodiments, each cache stores various information pertaining to the line frames in that cache. For example, the line frames in a set may be ranked or ordered based on how recently each line frame was accessed. In an illustrative set comprising five line frames, the most recently accessed line frame (e.g., accessed for a data read or write) may be ranked first, and the least recently accessed line frame may be ranked last. Alternatively, the least recently accessed line frame may be ranked first, and the most recently accessed line frame may be ranked last. Such rankings may be termed "least recently used" (LRU) rankings, mentioned above. In operation, when new data is to be stored in a set, the LRU rankings may be used to determine which line frame was least recently accessed. The data in the line frame which was least recently accessed may be removed, or "evicted," to make room for the new data to be stored in that line frame.

Use of the LRU rankings to evict data generally is performed in the context of set-associative caches. More specifically, a set-associative cache contains multiple line frames per set within which data from each lower-level memory location may be held. For example, in a two-way set associative cache, data from a single memory location in the L2 cache 118 is stored in two locations in the L1 cache 110. When determining which of the two locations in the L1 cache 110 to store a data value from the L2 cache 118, the LRU bits (or rankings) of the two locations are compared. Data in the location that is least-recently accessed is evicted to make space for the data value from the L2 cache 118. Other types of caches also may be used, such as fully-associative caches and direct-mapped caches. A direct-mapped cache comprises a single line frame per set within which data from a lower-level memory location may be held. A fully-associative cache enables the storage of a lower-level memory location into any line frame of the fully-associative cache.

Figure 3:
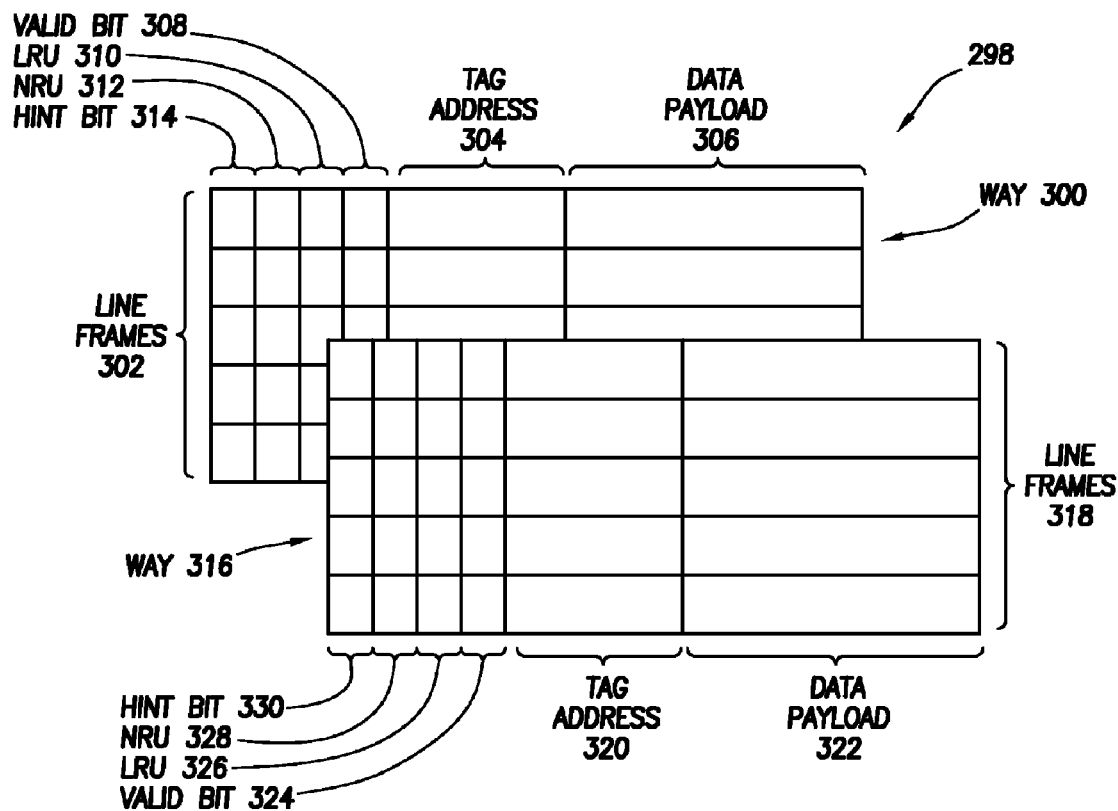
FIG. 3 shows an illustrative cache architecture associated with the cache system of FIG. 1, in accordance with various embodiments.

FIG. 3 shows a detailed view of a set-associative cache 298. The cache 298 is illustrative of a first-level cache (e.g., L1 caches 110, 112, 114, 116) and/or the L2 cache 118. The cache 298 comprises ways 300 and 316. Way 300 comprises line frames 302, and way 316 comprises line frames 318. Although ways 300 and 316 are shown comprising line frames, alternate representations may show sets comprising line frames. Each line frame 302 of way 300 comprises a hint bit field 314, an NRU bit field 312 and/or an LRU bit field 310, a valid bit field 308, a tag address field 304 and a data field (i.e., "line") 306. Likewise, each of the line frames 318 of way 316 comprises a hint bit field 330, an NRU field 328, an LRU field 326, a valid bit field 324, a tag address field 320, and a data field (i.e., "line") 322. In operation, a cache controller (e.g., cache controller 101) corresponding to the cache 298 searches the cache 298 to locate a line having a target address. The controller first locates a set in the cache which matches bits 13:5 (i.e., the set address) of the target address. When a matching set is found in the cache 298, the controller further locates a line frame in the matching set having a tag address field which matches bits 31:14 (i.e., the tag address) of the target address. If a matching line frame is found, the controller then determines whether the line (i.e., the data) in the line frame is valid by checking the valid bit field of the matching line frame. If the valid bit field indicates that the line in that line frame is valid, the core accesses the data and uses it as necessary.

If a matching line frame is not found in the cache 298, the cache 298 allocates space in the cache 298 to bring the requested line into the cache from a lower-level cache or memory. To allocate space in the cache 298, the cache controller 101 first determines whether there are any invalid lines in the cache 298 (i.e., using the valid bits 308). If an invalid line is found, that line is evicted and the new data brought in from the lower-level cache or from memory is stored in that line frame. However, if an invalid line is not found, the cache controller 101 obtains identification information (e.g., a predetermined, pre-assigned numeric or alphanumeric code) from the core requesting the data and uses the core identification information to evict a line within one or more ways that are dedicated to that particular core. In particular, the cache controller uses LRU and/or NRU rankings (or any other suitable replacement algorithm) to determine which cache line from the dedicated way(s) should be evicted. The cache controller subsequently evicts a suitable line and replaces the evicted line with new data brought in from a lower-level cache or from storage.

Cache ways may be dedicated to different cores in any suitable manner. For example, if a 32-way set associative cache is shared among four cores, each of the cores may have exclusive rights to 8 of the 32 ways. Thus, for example, ways 0-7 may be dedicated to core 102; ways 8-15 may be dedicated to core 104; ways 16-23 may be dedicated to core 106, and ways 24-31 may be dedicated to core 108. Thus, if a cache miss occurs in the shared cache, and there are no invalid lines in the shared cache that may be evicted to make space for new data, a line is evicted (using any suitable replacement algorithm) from the group of ways that is dedicated to the core requesting the data. In this way, if a core repeatedly requests data that is not found in the caches (i.e., starts thrashing), the negative consequences of the thrashing will not substantially affect the remaining three cores.

Figure 4:
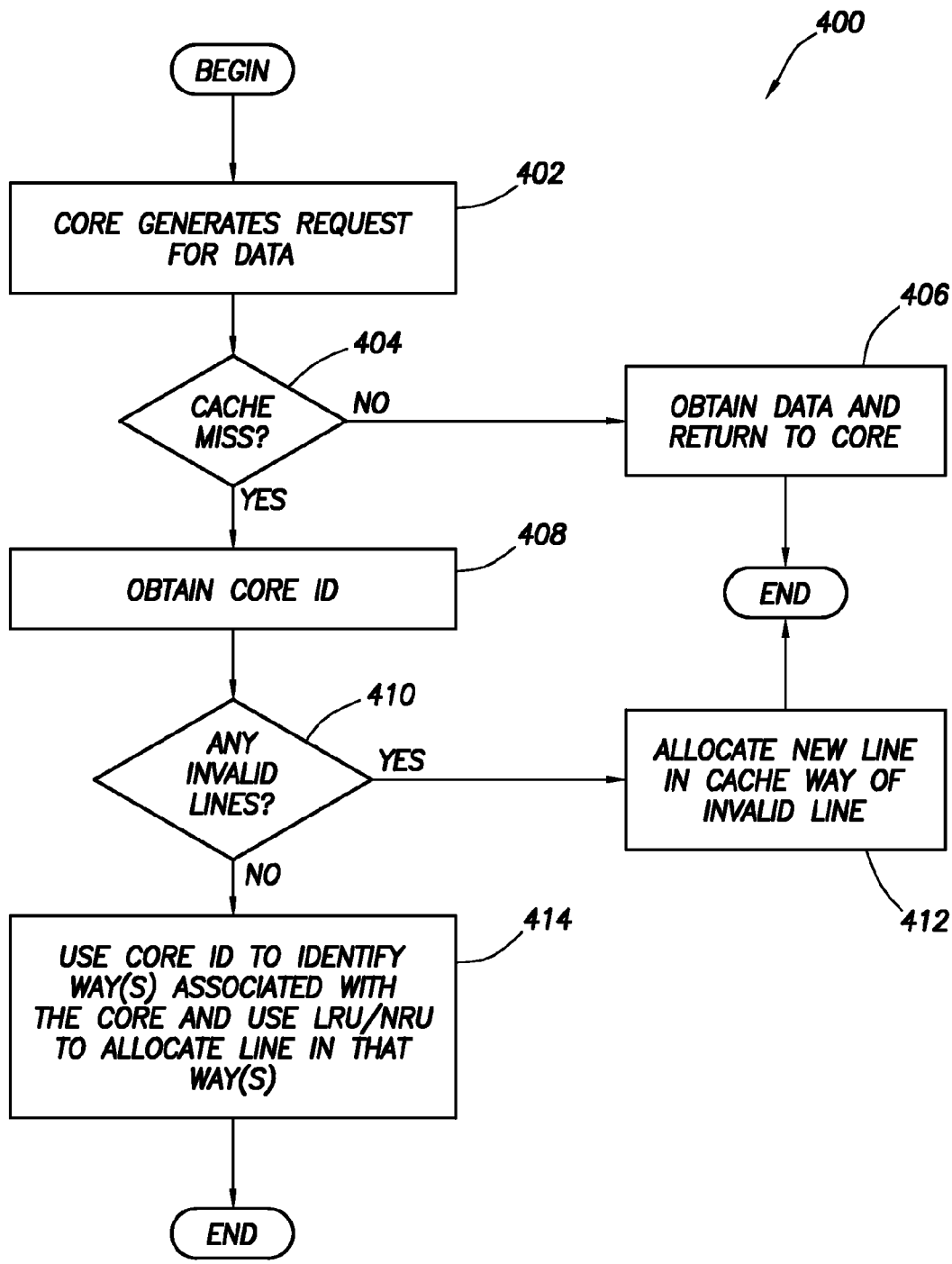

FIG. 4 shows a flow diagram of an illustrative method 400 implemented in accordance with various embodiments. The method 400 begins with a core generating a request for data (block 402). If a cache hit occurs in the core's cache (block 404), the method 400 comprises obtaining the data from the cache and returning it to the core (block 406). However, if a cache miss occurs in the cache, the method 400 comprises obtaining identifying information from the requesting core ("core ID") (block 408) and determining whether a predetermined number of lines (e.g., 1 line) in the shared cache are invalid (block 410). If an invalid line is found, the method 400 comprises allocating a new line in the cache way of the invalid line (block 412). However, if no invalid lines are found in the shared cache (block 410), the method 400 comprises using the core ID to identify way(s) associated with the core and using a suitable replacement algorithm (e.g., LRU, NRU) to allocate a line in one of the ways associated with that core (block 414). Some of the actions of the method 400 may be performed by a cache controller (e.g., the cache controller 101).

Referring again to FIG. 3, each of the line frames contains a hint bit 314, as previously mentioned. The hint bit 314 indicates whether a copy of the data stored in that line frame (i.e., data 306) is also stored in a higher-level cache. For example, referring to FIG. 1, a hint bit in the L2 cache 118 indicates whether data corresponding to the hint bit is also stored in one or more of the L1 caches 110, 112, 114 and 116. In at least some embodiments, a cache's hint bits are updated using "hint transaction" signals sent from upper-level caches. For example, when a line is evicted from one of the upper-level L1 caches, that L1 cache sends a hint transaction signal to the L2 cache 118, indicating the address or other information pertaining to the evicted line. In turn, the L2 cache 118 uses the address or other information in the signal to locate the corresponding line in the L2 cache 118 and updates the hint bit 314 associated with that line to reflect that the data is no longer stored in the L1 cache. Similar techniques may be used to update hint bits to reflect that an upper-level cache stores the data that is found in the L2 cache.

In some cases, an upper-level cache evicts data and send a hint transaction signal to the lower-level cache. However, a copy of the data evicted from the upper-level cache may still be stored in a different upper-level cache. For such cases, the lower-level cache may be configured either to adjust its hint bits upon receipt of a hint transaction signal from any of the upper-level caches, or to adjust its hint bits upon receipt of hint transaction signals from a predetermined number (e.g., all) upper-level caches. Other suitable hint transaction algorithms also may be implemented as desired.

Figure 5:
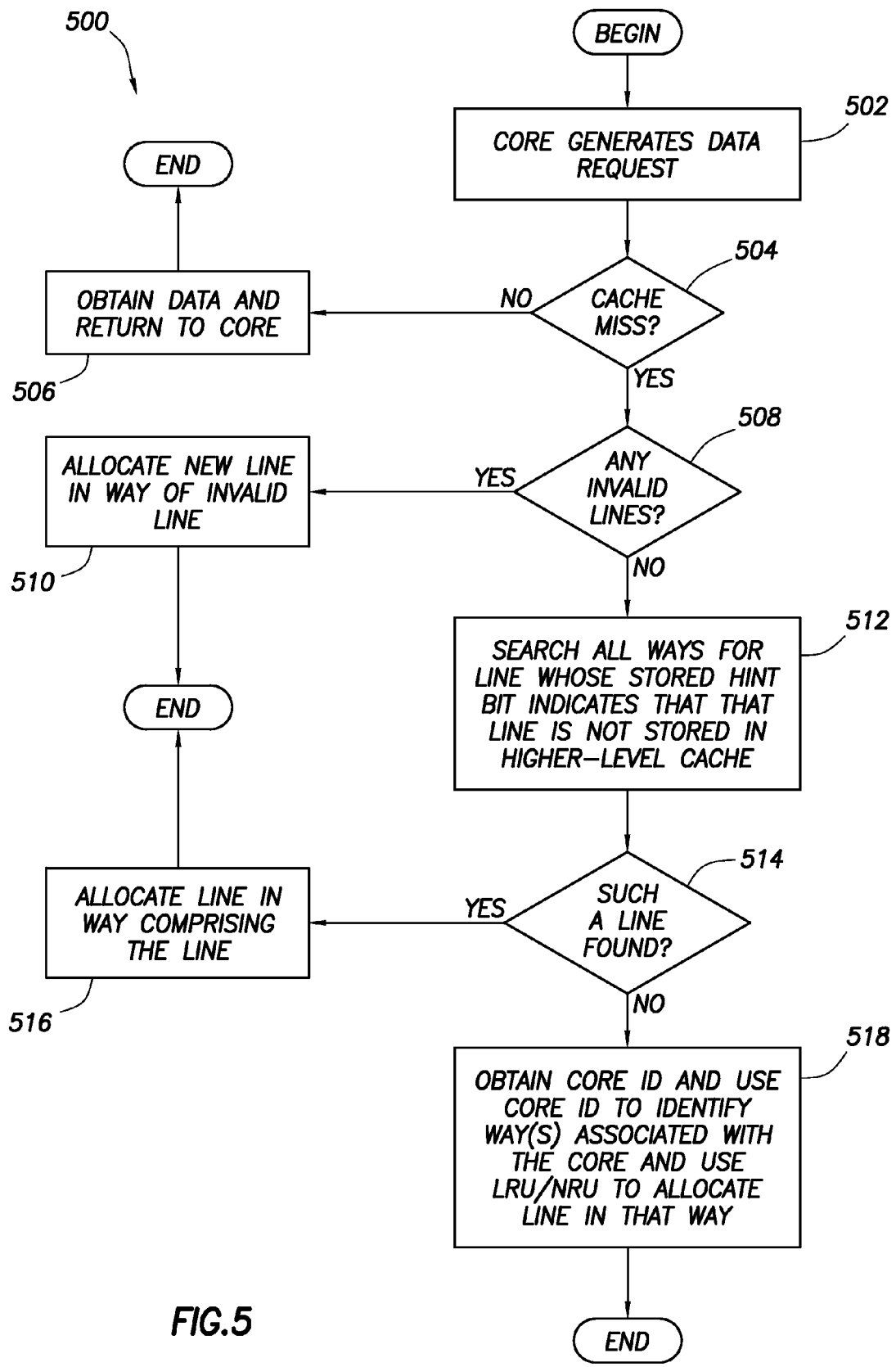

FIG. 5 shows a flow diagram of an illustrative method 500 implemented in accordance with various embodiments. The method 500 begins with a core generating a data request (block 502). The method 500 then comprises determining whether a cache miss has occurred (block 504). If not, the method 500 comprises obtaining the data and returning it to the core (block 506). If a cache miss has occurred, the method 500 comprises determining whether the cache comprises a predetermined amount of invalid lines (e.g., 1 invalid line) (block 508). If so, the method 500 comprises allocating a new line in the way of the invalid line (block 510). Otherwise, the method 500 comprises searching all ways for a line whose stored hint bit indicates that a copy of the line is not stored in a higher-level cache (block 512). The method 500 then comprises determining whether such a line is found (block 514). If so, the method 500 comprises allocating a line in the way that comprises the line that is found (e.g., using a cache controller) (block 516). Otherwise, the method 500 comprises obtaining identification from the core requesting the data ("core ID"), using the core ID to identify way(s) associated with the core and using a suitable replacement algorithm (e.g., LRU/NRU) to allocate a line in one of the identified way(s) (block 518).

Figure 6:
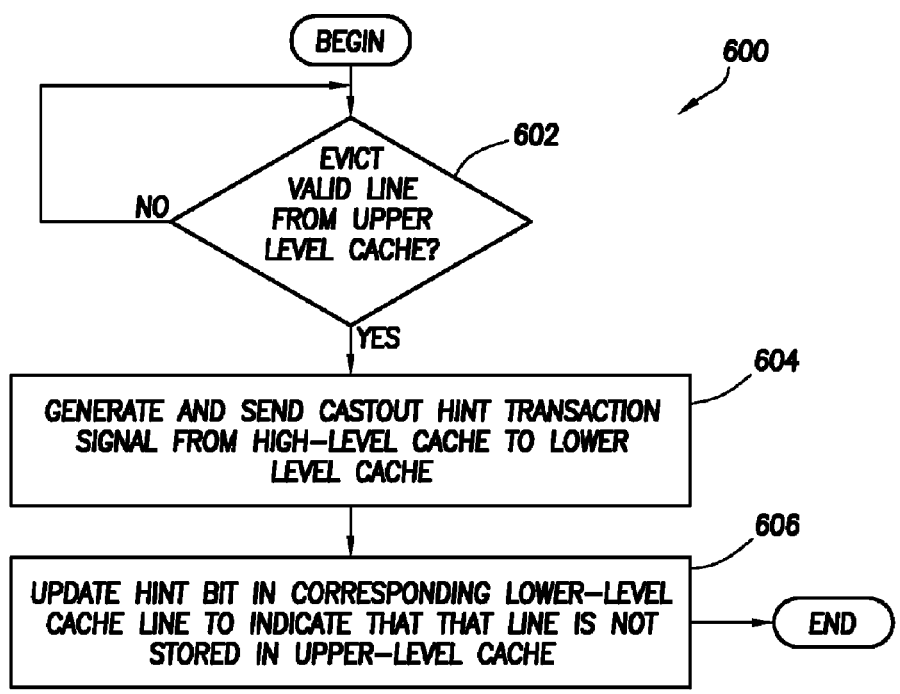
FIGS. 4-6 show flow diagrams of illustrative methods implemented in accordance with various embodiments.

FIG. 6 shows a flow diagram of an illustrative method 600 implemented in accordance with various embodiments. In particular, the method 600 is usable to update the hint bits described above. The method 600 comprises determining whether a valid line from an upper-level cache has been evicted (block 602). If so, the method 600 comprises generating and sending a hint transaction signal (e.g., a cast out hint transaction signal) from the higher-level cache to the lower-level cache (block 604). In some embodiments, if the evicted cache line was dirty, the data associated with that line may be copied to the lower-level cache as well. The method 600 also comprises updating the lower-level cache hint bit to indicate that a copy of the line is not stored in the upper-level cache (block 606). At least some of the actions of method 600 may be performed by a cache controller (e.g., the cache controller 101).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
  a processor core;
  a first cache coupled to the core and comprising at least one cache way dedicated to the core, said cache way comprising multiple, cache lines;
  a second cache coupled to the core, said second cache comprises a different level than said first cache; and
  a cache controller coupled to the first cache and the second cache;
  wherein, upon receiving a data request from the core, the cache controller determines whether said first cache has a predetermined amount of invalid cache lines;
  wherein, if the first cache has said predetermined amount of invalid cache lines not located in said at least one cache way dedicated to the core, the cache controller evicts an invalid cache line not located in said at least one cache way dedicated to the core and replaces the evicted, invalid cache line with data corresponding to said data request;

wherein, if the first cache does not have said predetermined amount of invalid cache lines, the cache controller is adapted to allocates space in the first cache for new data, the space allocable in said at least one cache way dedicated to the core;

wherein, if the first cache does not have the predetermined amount of invalid cache lines, the cache controller is configured to searches the at least one way in the first cache for a line associated with a hint bit that indicates that the line is not associated with another line stored in the second cache; and wherein, if a valid line is evicted from the second cache, the cache controller provides the first cache with a hint transaction signal that causes a line in the first cache corresponding to the valid, evicted line to indicate that the valid, evicted line is not stored in the second cache.

2. The system of claim 1, wherein the processor core provides an identification signal to the cache controller, and wherein the cache controller uses said identification signal to determine in which of a plurality of cache ways in the first cache said space should be allocated.

3. The system of claim 1, wherein the system further comprises another processor core, and wherein said first cache comprises a different cache way dedicated to said another processor core, and wherein the cache controller allocates additional space in the different cache way in response to another data request from said another processor core.

4. The system of claim 1, wherein said predetermined amount of invalid cache lines comprises one invalid cache line.

5. The system of claim 1, wherein the cache controller allocates said space in said at least one cache way dedicated to the core using either a Not Recently Used (NRU) or Least Recently Used (LRU) replacement algorithm.

6. The system of claim 1, wherein the system comprises a computer.

7. A system, comprising:
a first processor core associated with a first cache;
a second processor core associated with a second cache;
a third cache associated with both the first and second processor cores, said third cache comprises multiple ways, a different one of said multiple ways dedicated to each of the processor cores; and
a cache controller coupled to the first, second and third caches;
wherein, if a cache miss is generated in the first cache in response to a request for data and the third cache has a predetermined amount of invalid cache lines not located in said cache way dedicated to the first core, the cache controller evicts an invalid cache line not located in said cache way dedicated to the first core and replaces the evicted, invalid cache line with said data;
wherein, if a cache miss is generated in the first cache, and if there do not exist said predetermined number of invalid lines in said third cache, the cache controller searches each of multiple ways of the third cache for a line that indicates that the line is not stored in the first or second caches;
wherein, if said line is found, the cache controller allocates space in a target way of the third cache associated with the line and stores said data in said target way; and
wherein, if a valid line is evicted from said first cache or from said second cache, the cache controller locates a line in the third cache that corresponds to the valid, evicted line, and wherein the cache controller adjusts a hint bit associated with the line that corresponds to the valid, evicted line, said hint bit indicates whether the valid, evicted line is stored in the first cache or the second cache.

8. The system of claim 7, wherein, if said line is not found, the cache controller obtains identification associated with said first processor core and uses said identification to identify the different one of said multiple ways dedicated to the first processor core; and
wherein the third cache stores said data in said different one of said multiple ways dedicated to the first processor core.

9. The system of claim 8, wherein the third cache stores said data in said different one of said multiple ways dedicated to the first processor core using either a Not Recently Used (NRU) or Least Recently Used (LRU) replacement algorithm.

10. The system of claim 7, wherein the third cache comprises all information stored in the first and second caches.

11. The system of claim 7, wherein the system comprises a computer.

12. A method, comprising:
generating, by a processor core, a request for data;
determining whether a first cache comprises said data, said first cache comprising multiple ways, at least one of said cache ways dedicated to the processor core generating the request for data;
based on said first cache not comprising said requested data and existence of a predetermined number of invalid cache lines not located in said at least one cache way dedicated to the processor core, evicting an invalid cache line not located in said at least one cache way dedicated to the processor core and replacing the evicted, invalid cache line with said requested data;
if said first cache does not comprise said data and there are not a predetermined number of invalid lines in said first cache, searching ways of said first cache for a line that is not also stored in a second cache and replacing said line with said data;
if said line is not found, allocating space for said data in one of said multiple ways, the one of said multiple ways dedicated to processing logic that generated said request for data; and
if a valid line is evicted from the second cache, providing the first cache with a hint transaction signal that causes a line in the first cache corresponding to the valid, evicted line to indicate that the valid, evicted line is not stored in the another cache.

13. The method of claim 12, wherein the predetermined number is one.

14. The method of claim 12, wherein allocating space for said data comprises using at least one of a Not Recently Used (NRU) or Least Recently Used (LRU) replacement algorithm.

15. The method of claim 12, wherein determining whether the cache comprises said data comprises using a cache that is shared among multiple processor cores.

16. The system of claim 1, wherein the core has exclusive access over the at least one cache way dedicated to the core.

* * * * *

UNITED STATES PATENT AND TRADEMARK OFFICE
CERTIFICATE OF CORRECTION

PATENT NO. : 8,176,255 B2  
APPLICATION NO. : 11/875168  
DATED : May 8, 2012  
INVENTOR(S) : Patrick Knebel It is certified that error appears in the above-identified patent and that said Letters Patent is hereby corrected as shown below:

In column 6, line 53, in Claim 1, delete "multiple," and insert -- multiple --, therefor.

In column 7, lines 2-3, in Claim 1, after "controller" delete "is adapted to".

In column 7, lines 7-8, in Claim 1, after "controller" delete "is configured to".

In column 7, line 20, in Claim 2, after "in which" delete "of".

Signed and Sealed this  
Twenty-seventh Day of November, 2012

David J. Kappos  
*Director of the United States Patent and Trademark Office*